2,990,641
HOOKS

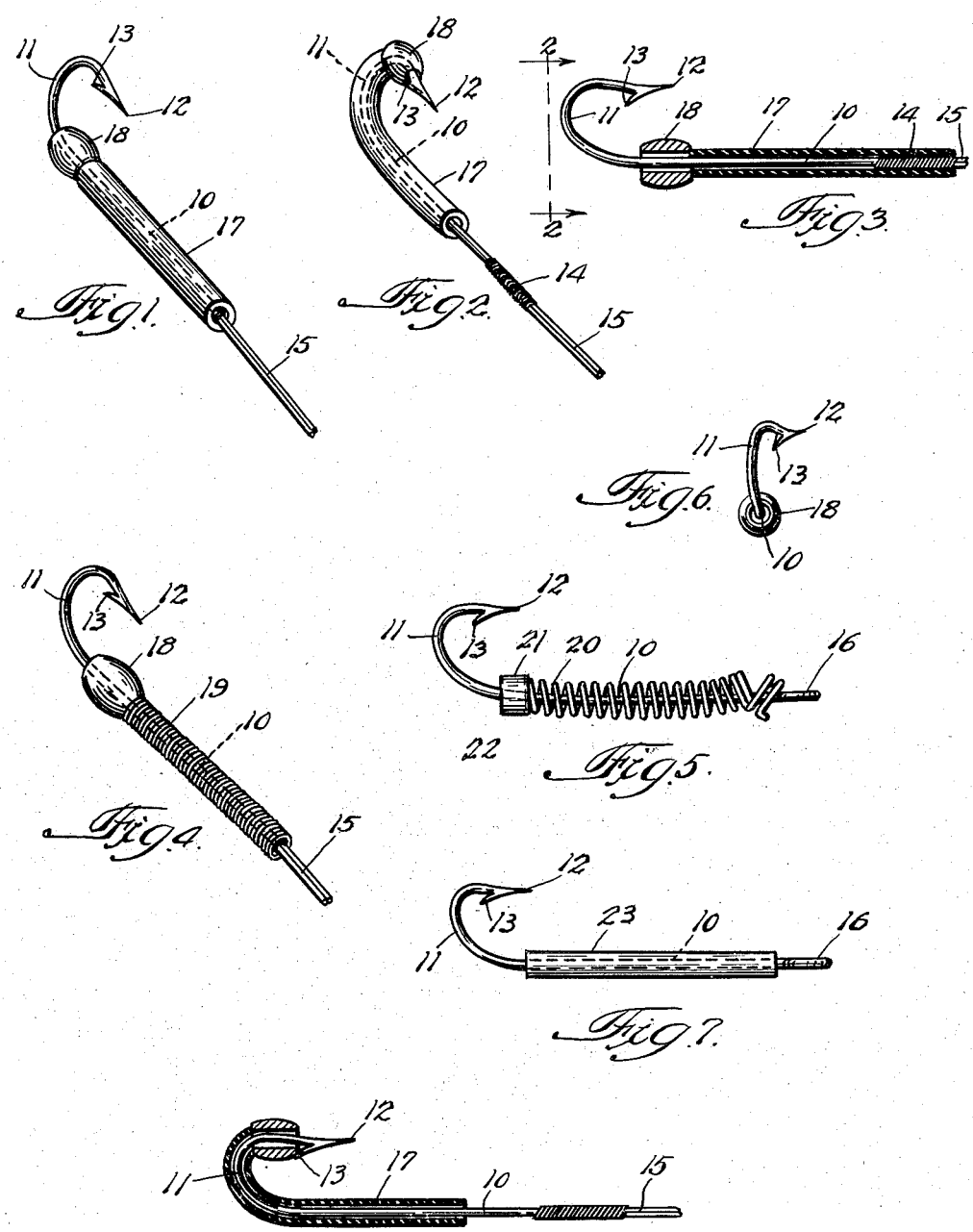

Floyd C. Weidman, Lincoln Hotel, 519 E. State St., Hammond, Ind., assignor of one-third to Lester A. Ottenheimer, East Chicago, Ind.
Filed Jan. 9, 1957, Ser. No. 633,364
5 Claims. (Cl. 43—43.16)

This invention relates to hooks. For the purposes of this patent the invention shall be exposited in its relation to fishhooks although it will be understood that this exposition is purely illustrative and in no way limiting.

The conventional fishhook has a shank and is provided at one end with an eye or other means for attachment to a leader and at the other end with a loop terminating in a sharp point with a reversely directed barb adjacent to the point. The sharp point functions to enter the flesh of the fish readily and the barb functions to retain the fish on the hook until the fish is landed or caught. The barb is necessary for the effective use of the hook in catching and retaining the fish but is objectionable when it is desired to remove the hook from the fish.

Various fishhooks have heretofore been proposed which have contemplated the use of wire, thread or other guards in attempts to render inoperative the barb of a fishhook so that it might readily be withdrawn from the flesh of a fish. However, the prior structures are objectionable in that they are expensive, cumbersome, and of doubtful effectiveness in that, for example, they tend to interfere with the normal operation of the barb on fishhooks.

Accordingly, it is an object of this invention to provide means for rendering ineffective the barb of a fishhook after a fish has been caught so that the hook may be removed readily and without further damage to the fish, so that the operation of the barb is not impaired until it is desired to remove the hook from the fish, and which means is of simple inexpensive construction. For the purposes of this patent, the rendering ineffective of the barb of a fishhook shall consist in the closing of the barb by the occupying of the space between the barb and the body of a fishhook or shall consist in the occupying of the point of the barb, by means slidably mounted on the fishhook.

It is a further object of this invention to provide means for rendering ineffective the barb of a fishhook so that any animal or vegetable matter such as crayfish or weed that is of sufficient penetrability to be impaled on the point of a fishhook and the barb may be quickly and easily removed.

It is a further object of this invention to provide means for rendering ineffective the barb of a fishhook which means may be constructed so as to serve as a weight or sinker to maintain the hook below the surface of the water being fished.

It is a further object of this invention to provide means for rendering ineffective the barb of a fishhook which means may include a spring element to normally retain the barb-closing means along the shank of the hook away from the barb and automatically return the barb-closing means to its normal position after use.

Further and additional objects will appear from a consideration of this specification, the accompanying drawings, and the appended claims.

In carrying out this invention in one form a flexible sleeve is placed upon the shank of a conventional barbed fishhook. The sleeve may be constructed, for examples, of plastic or of wire. The sleeve may be moved from the shank over the loop of the hook to the barb which it closes so that the barb is rendered ineffective to permit withdrawing the hook from the flesh of fish or from other matter. The sleeve may perform the function of closing the barb or may be provided with a rounded appendage toward its loop end, which appendage is soft relative to the hook so that the barb may sink into it when it is desired to close the barb.

For a more complete understanding of this invention reference will now be made to the accompanying drawings wherein:

FIGURE 1 is a perspective view of a barbed fishhook embodying this invention in one form and with the components of the form in normal position.

FIG. 2 is a perspective view of a barbed fishhook embodying this invention with the components of the form shown in FIG. 1 in effective barb-closing position.

FIG. 3 is a cross-sectional side elevation of a barbed fishhook embodying this invention shown in FIG. 1 with the components of the form in normal position.

FIG. 4 is a perspective view of a barbed fishhook embodying this invention in another form with the components of the form in normal position.

FIG. 5 is a side elevation of a barbed fishhook embodying this invention in still another form with the components of the form in normal position.

FIG. 6 is a view on the line 2—2 of FIGURE 3 of the loop end of the barbed fishhook embodying this invention shown in FIG. 1 with the components of the form in normal position.

FIG. 7 is a side elevation of a barbed fishhook embodying this invention in still another form with the components of the form in normal position; and FIG. 8 is a cross-sectional side elevation of the barbed fishhook shown in FIG. 1 with the components of the form in effective barb-closing position.

Referring now to the drawings, and to each of the figures, conventional fishhooks are illustrated with a shank 10, a loop or bight 11, a point 12, and a barb 13. The fishhook of FIGS. 1, 2, 3 and 8 is illustrated with a snell 14 attaching the hook to the leader 15. The fishhook of FIGURES 5 and 7 is illustrated with an eye 16 for the attachment of the hook to a leader. The two means of attachment as well as others may be employed with this invention interchangeably.

Referring more particularly to FIGURES 1, 2, 3 and 8 a conventional fishhook is illustrated with a flexible sleeve constructed of a plastic material 17 in combination with a soft rounded member 18 which may be moved along the hook around the loop 11 to close the barb 13 by partially occupying the space between the barb and the loop and by occupying the point of the barb. FIGURES 1 and 3 illustrate the flexible components in normal position on the shank 10, while FIGURES 2 and 8 illustrate the flexible components in a position effective to close the barb.

Referring now to FIG. 4, a conventional fishhook is illustrated with a flexible sleeve of a wound wire construction 19 in combination with a soft rounded member 18 which sleeve may be moved along the hook around the loop 11 to close the barb 13 by partially occupying the space between the barb and the loop and by occupying the point of the barb.

Referring now to FIGURE 5, a conventional fishhook is illustrated with a flexible sleeve of a wire spring construction 20 in combination with a circumferent metallic member 21 which member is provided in the illustrated embodiment with a cutting edge 22. The sleeve of FIG. 5 may also be moved from its normal illustrated position along the hook around the loop 11 to the barb 13. In the embodiment of FIG. 5 the cutting edge 22 serves to expedite the removal of impaled matter from the hook by its cutting action, while the flexible spring 20 serves to return the sleeve to its illustrated normal position when the cutting operation is completed.

Referring now to FIG. 7, a conventional fishhook is illustrated with a flexible sleeve of a homogeneous plastic construction 23 which may be moved along the hook around the loop 11 to close the barb 13 by occupying the space between the barb and the loop. The embodiment of FIG. 7 is particularly suitable for use with smaller fishhooks such as would be used in fishing for perch or other pan fish.

The operation of a fishhook embodying this invention may be summarized as follows: The sleeve, 17, 19, 20, or 23, is normally disposed upon the shank 10. After a fish is landed or caught, the fisherman may grasp the leader 15 in one hand while with the other hand moving the sleeve and appendage 18 or 21, where present, along the hook around the loop 11 into a closed relationship with the barb 13. The hook is then gently removed from the flesh of the fish with a simple circular or rotative movement of the hook.

It is obvious that the various embodiments of this invention illustrated provide advantages and improvements in the manner of removing hooks from fish not only unknown but unforeseeable by those merely skilled in the art. This invention permits the attainment of a degree of preservation of fish for mounting hitherto impossible. This invention also eliminates a needless waste by the prevention of fatal damage to the flesh of young or small fish which, because of game laws, must be returned to the water when caught. It will be seen in addition that the embodiments of this invention may be manufactured inexpensively in comparison with the cumbersome and diverse attempts to solve these problems in the prior art. It will be seen further that the embodiments of the barb-closing elements of this invention in no way interfere with the normal operation of a barb and that this is of paramount importance in the catching of fish.

It will be seen also that the barb-closing elements of this invention may serve additionally as a weight or sinker for the hook; that these elements may be constructed in various shapes and finished in various colors to serve as fish lures; and that these elements may be maintained in a barb-closing relationship during storage for greater safety and convenience in handling than is possible with the conventional fishhook alone.

While several particular embodiments of this invention are illustrated and/or described above, it is obvious and will be understood as of course that the invention is not to be limited thereto. However, it is my intention and belief that the foregoing will so clearly set forth the best mode contemplated of carrying out my invention and so fully explain its character that others, by applying current knowledge, may readily adapt the invention for use under varying conditions of service, while retaining certain features which may properly be said to constitute the essential items of novelty involved. These items are intended to be defined and secured to me by the following claims.

I claim:

1. The combination of a fishhook having a shank, having one end attachable to a leader, having the other end looped and terminating in a point, and having a barb reversely directed from the point and adjacent thereto, and means for rendering said barb ineffective comprising a sleeve circumferentially disposed upon the shank thereof and slidable between a position spaced from said barb and a position of closed relationship with the barb of the hook so as to render the barb ineffective, the inner diameter of said sleeve being normally less than the total transverse dimension of said barb and the adjacent portion of said looped end, said sleeve being transversely flexible whereby it conforms to said shank as it is moved therealong, and said sleeve having sufficient longitudinal rigidity whereby longitudinal force applied to the end thereof adjacent said one end of the shank is transmitted through said sleeve to urge the other end thereof into the space between said barb and said shank.

2. The combination of a fishhook having a shank, having one end attachable to a leader, having the other end looped and terminating in a point, and having a barb reversely directed from the point and adjacent thereto, and means for rendering said barb ineffective comprising a sleeve circumferentially disposed upon the shank thereof and slidable along the hook between a position spaced from said barb and a position of closed relationship with the barb of the hook, said sleeve having a cutting edge disposed around that end periphery nearest the barb of the hook, the inner diameter of said sleeve being normally less than the total transverse dimension of said barb and the adjacent portion of said looped end, said sleeve being transversely flexible whereby it conforms to said shank as it is moved therealong, and said sleeve having sufficient longitudinal rigidity whereby longitudinal force applied to the end thereof adjacent said one end of the shank is transmitted through said sleeve to urge the other end thereof into the space between said barb and said shank.

3. The combination of a fishhook having a shank, having one end attachable to a leader, having the other end looped and terminating in a point, and having a barb reversely directed from the point and adjacent thereto, and means for rendering said barb ineffective comprising a sleeve circumferentially disposed upon the shank thereof and slidable along the hook between a position spaced from said barb and a position of closed relationship with the barb of the hook such that the space between the barb and the body of the hook is occupied by the sleeve, said sleeve consisting of metal wire closely wound upon the body of the hook in helical form, the inner diameter of said sleeve being normally less than the total transverse dimension of said barb and the adjacent portion of said looped end, said sleeve being transversely flexible whereby it conforms to said shank as it is moved therealong, and said sleeve having sufficient longitudinal rigidity whereby longitudinal force applied to the end thereof adjacent said one end of the shank is transmitted through said sleeve to urge the other end thereof into the space between said barb and said shank.

4. The combination of a fishhook having a shank, having one end attachable to a leader, having the other end looped and terminating in a point, and having a barb reversely directed from the point and adjacent thereto, means for rendering said barb ineffective comprising a sleeve circumferentially disposed upon the shank thereof and slidable along the hook between a position spaced from said barb and a position of closed relationship with the barb of the hook such that the space between the barb and the body of the hook is occupied by the sleeve, said sleeve consisting of metal wire closely wound upon the body of the hook in helical form, and a rounded end on the sleeve adapted to close the barb and which end is solid and of larger circumference relative to the wire portion of the sleeve, the inner diameter of said sleeve being normally less than the total transverse dimension of said barb and the adjacent portion of said looped end, said sleeve being transversely flexible whereby it conforms to said shank as it is moved therealong, and said sleeve having sufficient longitudinal rigidity whereby longitudinal force applied to the end thereof adjacent said one end of the shank is transmitted through said sleeve to urge the other end thereof into the space between said barb and said shank.

5. The combination of a fishhook having a shank, having one end attachable to a leader, having the other end looped and terminating in a point, and having a barb reversely directed from the point and adjacent thereto, and means for rendering said barb ineffective comprising a sleeve circumferentially disposed upon the shank thereof and slidable along the hook between a position spaced from said barb and a position of closed relationship with the barb of the hook such that the space between the barb and the body of the hook is occupied by the sleeve, said sleeve consisting of a substantially homogeneous plastic composition, the inner diameter of said sleeve being normally less than the total transverse dimension of said barb and the adjacent portion of said looped end, said sleeve being transversely flexible whereby it conforms to said shank as it is moved therealong, and said sleeve having sufficient longitudinal rigidity whereby longitudinal force applied to the end thereof adjacent said one end of the shank is transmitted through said sleeve to urge the other end thereof into the space between said barb and said shank.

References Cited in the file of this patent

UNITED STATES PATENTS

| | | |
|---|---|---|
| 103,645 | Muscroft | May 31, 1870 |
| 185,914 | Gregg | Jan. 2, 1877 |
| 662,139 | Warren | Nov. 20, 1900 |
| 1,611,544 | Maurus | Dec. 21, 1926 |
| 2,098,095 | Hoeffler | Nov. 2, 1937 |
| 2,441,232 | Bakken | May 11, 1948 |
| 2,572,608 | Gabor | Oct. 23, 1951 |
| 2,599,684 | Bakken | June 10, 1952 |
| 2,792,662 | Norton | May 21, 1957 |
| 2,861,383 | Gray | Nov. 25, 1958 |

FOREIGN PATENTS

| | | |
|---|---|---|
| 118,500 | Sweden | Apr. 1, 1947 |